Oct. 1, 1957  R. J. MILLENAAR  2,807,830
SAUSAGE LINKING MACHINE
Filed April 10, 1956  2 Sheets-Sheet 1

INVENTOR.
Richard J. Millenaar,
BY
Cromwell, Greist & Warden
Attys

Oct. 1, 1957 — R. J. MILLENAAR — 2,807,830
SAUSAGE LINKING MACHINE
Filed April 10, 1956 — 2 Sheets-Sheet 2
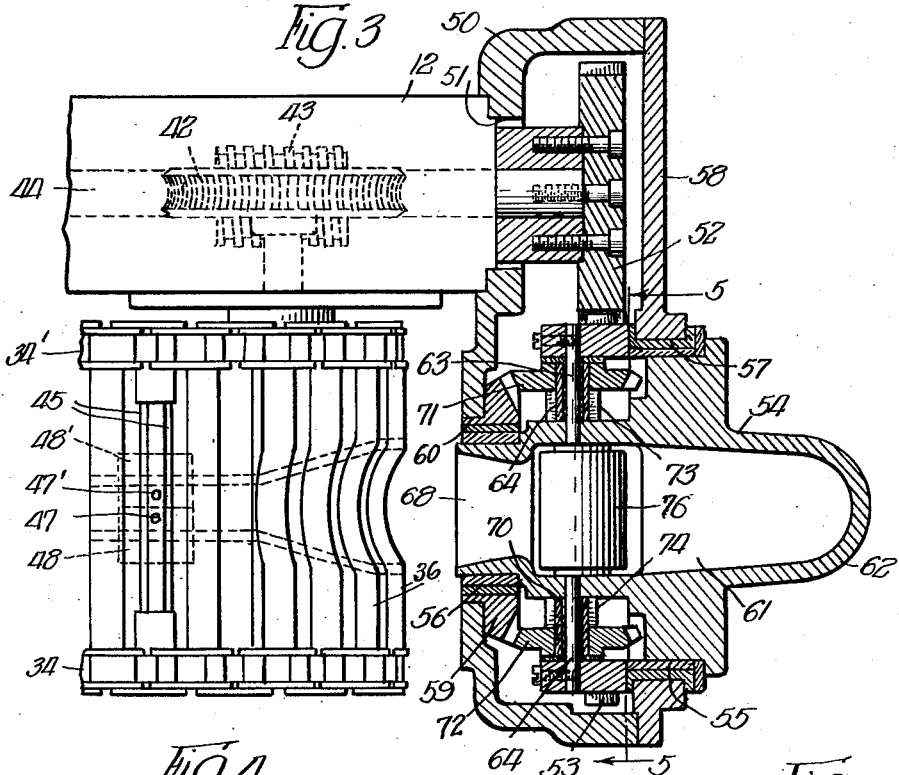
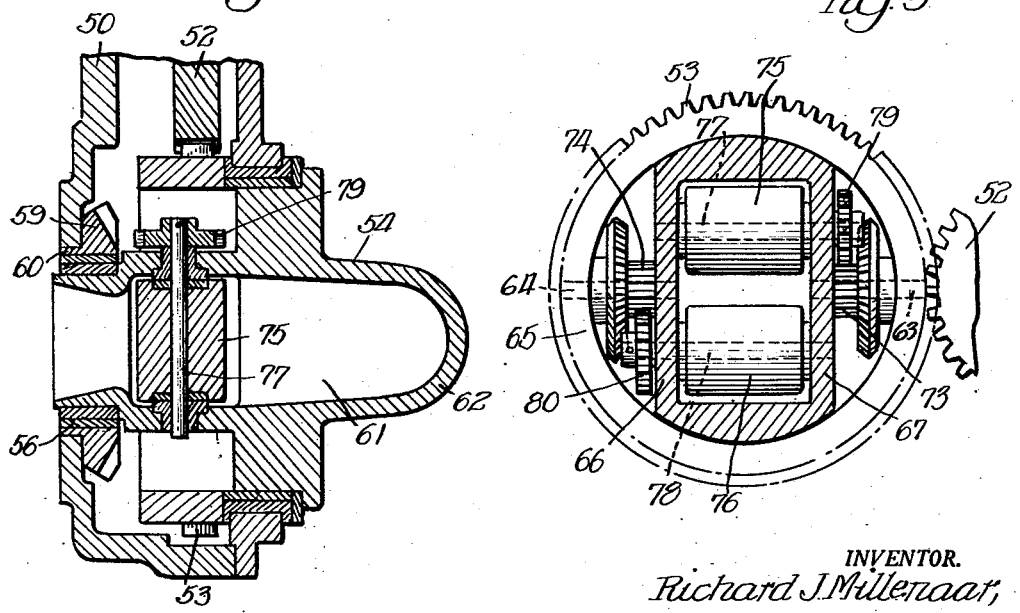
INVENTOR.
Richard J. Millenaar,
BY
Cromwell, Greist & Warden
Attys

United States Patent Office 2,807,830
Patented Oct. 1, 1957

2,807,830

SAUSAGE LINKING MACHINE

Richard J. Millenaar, Madison, Wis., assignor to Kartridg-Pak Machine Co., Chicago, Ill., a corporation of Iowa Application April 10, 1956, Serial No. 577,306

10 Claims. (Cl. 17—34)

This invention relates to machines for the manufacture of sausages of the character in which a length of filled or stuffed casing is divided into individual sausage links of generally uniform length and a twist is imparted to the casing between successive links.

It is a general object of the invention to provide improvements in a mechanism for the production of link sausages of the type which will divide a filled casing at predetermined intervals into link forming sections of uniform length and automatically rotate successive links in the same direction to provide a twist in the casing in the areas joining the links while advancing the links and delivering the same to a rapidly rotating cylindrical container in which the links are deposited in coiled relation.

It is a more specific object of the invention to provide an improved machine for manufacturing link sausages of the type which is characterized by mechanism for advancing a filled casing and dividing the same into link forming sections and mechanism for axially rotating each successive link to impart a twist in the casing between it and the next succeeding link while advancing the links through the open end of a rapidly rotating cylinder to distribute the same in coil formation around the inner wall of the cylinder.

It is another object of the invention to provide in a sausage linking or twisting machine of the type described an improved link twisting and distributing mechanism which advances the links through a restricted passageway therein at a uniform rate and distributes the twisted links in a coil around the inner wall of a rapidly rotating link accumulating cylinder.

It is a further object of the invention to provide in a sausage linking machine of the type described a link twisting and distributing head wherein a passageway is provided through which the sausages advance in the direction of the axis thereof and driven rollers in the passageway for frictionally gripping the sausages and advancing the same at a uniform rate.

These and other objects of the invention will be understood from a consideration of the mechanism which is shown by way of illustration in the accompanying drawings, wherein:

Fig. 3 is a fragmentary top plan view to an enlarged scale, showing the link twisting and distributing head in horizontal section and adjacent portions of the casing dividing mechanism;

Fig. 4 is a cross section taken on the line 4—4 of Fig. 2; and

Fig. 5 is a cross section taken on the line 5—5 of Fig. 3.

Figure 1:
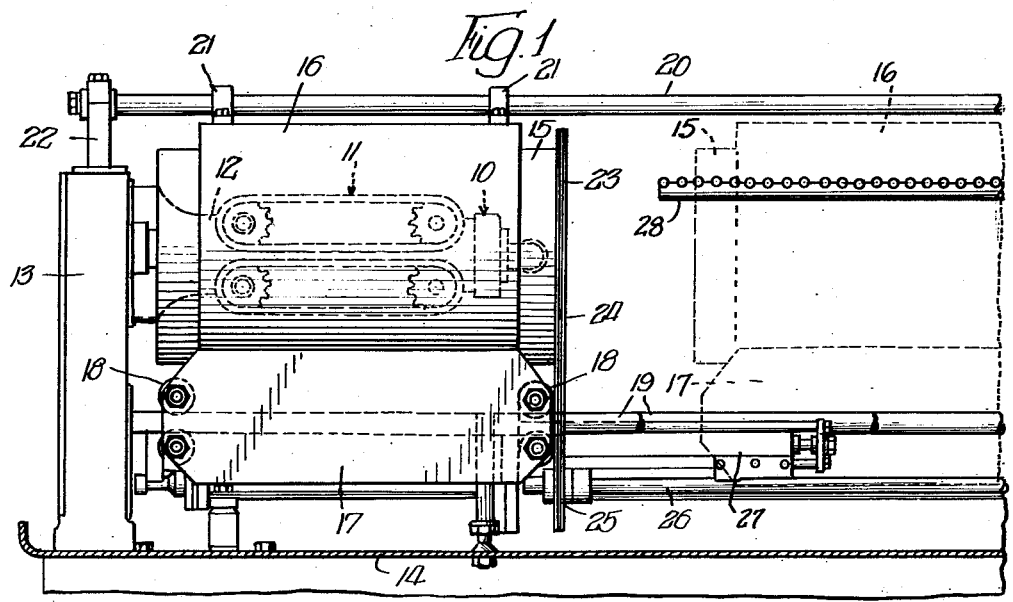
Fig. 1 is a fragmentary side elevation of a sausage linking machine having link twisting and distributing mechanism incorporated therein which embodies the principal features of the invention.

Referring to Fig. 1 of the drawing, there is illustrated a portion of a sausage linking machine having incorporated therein a link twisting and distributing mechanism 10 which is constructed in accordance with the principles of the invention. The other mechanisms with which the mechanism 10 is employed may be constructed in accordance with known principles and only those details of the machine which are necessary for a full understanding of the present improvement are referred to while other details of the machine are not herein described.

The link twisting and distributing mechanism or head 10 is constructed to cooperate with a continuously driven endless chain mechanism 11 which operates to feed successive lengths of stuffed sausage casing along a horizontal path and to divide the same into a plurality of link forming sections of uniform size, which are delivered successively to the twisting and distributing head 10. The casing feeding and dividing mechanism 11 and the twisting and distributing mechanism 10 are supported in laterally extending relation along one side of a horizontally extending shaft housing 12, which is in turn supported on an upright housing 13, which extends transversely of one end of the machine and forms part of the main frame of the machine, which is indicated at 14, and houses the main driving mechanism for the machine.

The shaft housing 12, the casing feeding and dividing mechanism 11 and the link twisting and distributing head 10 all project forwardly of the front or inner face of the upright housing 13 and project initially into an open ended cylindrical receptacle 15 which is rotatably mounted within the upper portion of a horizontally reciprocable carriage 16. The carriage 16 has laterally spaced depending side plates 17 which are supported by longitudinally spaced pairs of rollers 18 mounted thereon and horizontally extending laterally spaced lower guide rods or bars 19 which also extend horizontally from the forward face of the end housing 13 below the shaft housing 12. The horizontal supporting guide bars 19 are attached to a suitable upstanding bracket (not shown) at the other end of the main frame 14. The carriage 16 is guided at its upper side by a horizontally extending top guide rod or bar 20, the carriage being provided with bearing brackets 21 on the upper side for slidably receiving the guide bar 20. The top guide bar 20 is supported at one end on an upright bracket 22 on the end housing 13 and at the other end on an upright post (not shown) on the main support frame 14. The rotatable link accumulating cylinder 15 has a sprocket 23 at its forward end which is connected by drive chain 24 with a drive sprocket 25 which is slidably mounted by means of a splined connection on a horizontal drive shaft 26 which extends forwardly from the end housing 13 and is connected with the main drive in the latter, the shaft 26 being suitably supported on the housing 13 and the main frame 14. A suitable mechanism (not shown) is provided for advancing the carriage 16 horizontally along the guide rails or bars 19 and 20 while the carriage 16 is being rotated at a relatively high rate of speed so that the links are arranged in coil formation around the inner wall of the accumulating cylinder 15 as they are delivered thereto by the twisting and distributing head 10. The machine includes mechanism indicated at 27 for advancing the carriage 16 and the link accumulating cylinder 15 to a position at the other end of the machine, as indicated in dotted line, when the twisting of the last link in a length of stuffed casing is completed, where a horizontal coil receiving bar 28 is positioned within the cylinder 15, mechanism for discontinuing the rotation of the cylinder to allow the coil of links to collapse on the bar 28, and mechanism for thereafter returning the carriage 16 to its initial position, and for resuming rotation of the cylinder 15 so that the cycle of operations may be repeated. The completed links are, of course, subsequently removed from the receiving bar 28 for further processing.

Figure 2:
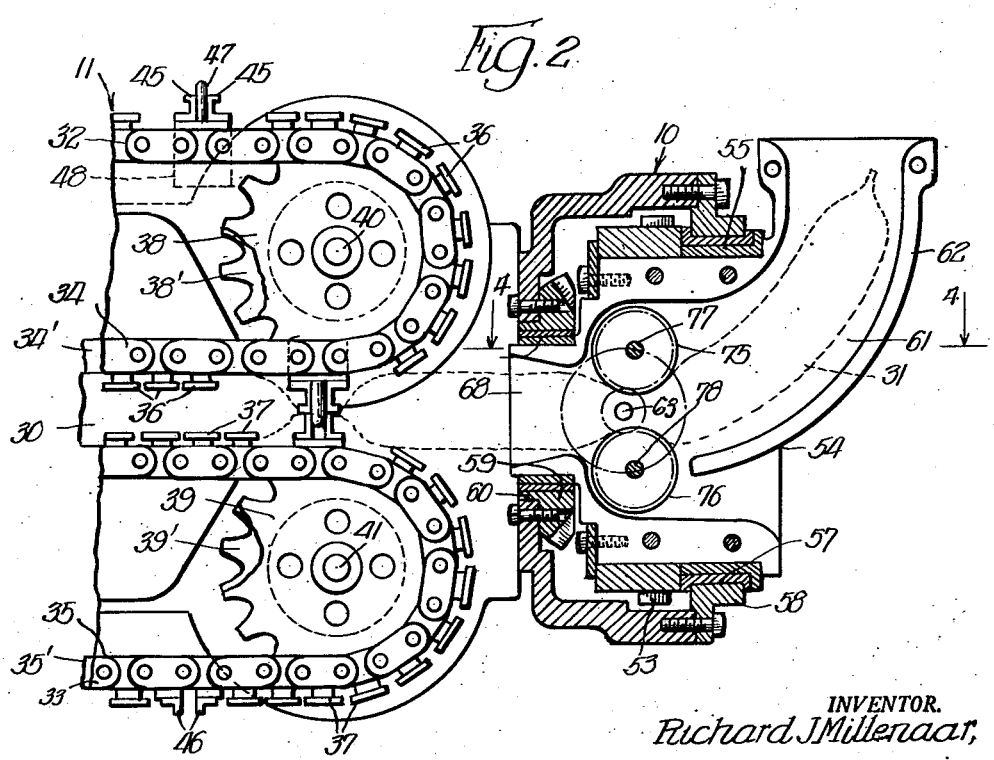
Fig. 2 is a fragmentary side elevation, partly in longitudinal section and to an enlarged scale, showing the link twisting and distributing head and adjacent portions of the casing dividing mechanism.

The link twisting and distributing head is supported at the end of the shaft housing 12 and extends laterally thereof into the path of the sausage casing 30 (Fig. 2) as the latter is divided into a connected series of links 31 and advanced thereto by the casing feeding and dividing mechanism 11. The stuffed casing 30 is advanced horizontally between opposed runs of vertically spaced upper and lower chain conveyors 32 and 33. The conveyors 32 and 33 comprise pairs of laterally spaced endless chains 34, 34' and 35, 35' which carry a plurality of cross bars 36 and 37. The cross bars 36 and 37 travel in paths which bring them into confronting relation along the opposed runs of the conveyors and grip the casing 30 between the same. The chains 34, 34' and 35, 35' of the respective conveyors 32 and 33 are carried at one end on idler sprockets and at the other end on upper and lower sets of end sprockets 38, 38' and 39, 39' which have their supporting shafts 40 and 41 journalled in the side wall of the shaft housing 12. The shafts 40 and 41 are provided with gears 42 which engage in driving relation with a pinion gear 43 on the drive shaft 44 which is supported in the housing 12. The conveyors 32 and 33 carry cooperating sets of cross bars 45 and 46 which are spaced along the chains the required distance for dividing the casing into sections of predetermined length and each set of the cross bars 45 on the upper conveyor 32 has associated therewith a pair of casing constricting pins 47, 47' which project outwardly between the cross bars 45 from supporting blocks 48, 48', the latter being mounted for lateral sliding movement. Suitable cam formations (not shown) are provided on the blocks 48, 48' together with fixed cam tracks for controlling lateral movement of the casing constricting pins 47, 47' to constrict the casing 30 at the point where it is divided by the cross bars 45 and 46 and advanced between the end sprocket formations 38 and 39 and into the throat of the twisting head 10.

The twisting and distributing head 10 is mounted on the end of the shaft housing 12 in a laterally extending housing 50 which is bolted or otherwise secured to the housing 12. The end of drive shaft 44 extends through a bearing aperture 51 in the housing 50 and a gear 52 is secured thereon which engages in driving relation with a ring gear 53 on a rotatably mounted nozzle and throat forming member 54. The latter may be formed in two parts or half sections to permit proper assembly. The nozzle and throat forming member is mounted for rotation in the housing 50 in longitudinally spaced bearings 55 and 56. The bearing 55 is mounted in an aperture 57 in a cover plate 58 for the housing 50 while the bearing 56 is mounted in an apertured bevel gear 59 which is in turn mounted in the aperture 60 in the wall of the housing 50. The nozzle and throat forming member 54 is hollow and provides an angled passageway 61 through which the successive sausage links 31 are passed while they are twisted. The nozzle forming end 62 of the member 54 guides the links into the rotating cylinder 15 and distributes them in coil formation around the inside surface of the wall thereof.

A pair of relatively small shafts 63 and 64 extend between the ring gear supporting portion 65 of the member 54 and parallel spaced inner web or wall portions 66 and 67 which form the side walls of the internal passageway 61 adjacent the throat end 68 of the member 54. The shafts 63 and 64 support rotatable sleeves 69 and 70 on which are secured bevel gears 71 and 72 and pinion gears 73 and 74. The bevel gears 71 and 72 engage in driving relation with the gear 59 which is fixed to the housing 50 so that rotation of the member 54 causes the pinion gears 73 and 74 to turn in opposite directions. A pair of spaced friction rollers 75 and 76 are arranged in the passageway 61 adjacent the throat end 68 thereof on shafts 77 and 78 which are journalled between the wall forming webs 66 and 67 and which carry at opposite ends thereof gears 79 and 80 which are in driving relation with the oppositely rotating pinions 73 and 74 so that when the member 54 is rotating in the housing 50 the friction rollers 75 and 76 grip the successive sausage links 31 and positively feed them through the passageway 61 with a uniform advancing movement.

With the successive links 31 fed through the passageway 61 by the friction rollers 75 and 76, any unevenness in the rate of movement of the links, which might otherwise occur when centrifugal pull on the casing alone is relied upon to advance the casing, is eliminated and uniform twisting is assured. Also the links are under control from the instant they pass through the throat or entrance 68 to the passageway 61 and twisting begins immediately.

While the twisting and dividing mechanism 10 is illustrated and described as used with a particular casing feed and dividing mechanism, it will be understood that it may be used with other mechanisms for feeding and dividing the casing which may be employed in this type of linking machine.

I claim:

1. In a sausage linking machine having a casing advancing and dividing means, and an open ended link accumulating cylinder rotatably mounted relative to the discharge end of the casing advancing and dividing means to receive the twisted links through the open end thereof, a link twisting and distributing head arranged between the casing advancing and dividing means and the rotating cylinder, said head comprising a housing having a throat forming opening therein, said head being mounted so that the throat opening is alined with the casing advancing and dividing means and the axis of rotation of the accumulating cylinder, a throat ring rotatably mounted in the opening and having a tubular extension projecting in a forward and lateral direction therefrom and forming a passageway for guiding the links into the accumulating cylinder, a pair of spaced friction rollers mounted in said passageway adjacent said throat ring, and drive means between said housing and said friction rollers for rotating said friction rollers in a direction to frictionally grip the links and advance them through said passageway.

2. In a sausage linking machine characterized by a supporting frame structure with means thereon for continuously advancing a filled sausage casing in a predetermined path and for constricting the casing at intervals to divide the same into individual links of uniform length and having an open ended tubular container for receiving the connected links, which tubular container is movably supported adjacent the end of said casing advancing and constricting means and which tubular container has means operatively connected thereto for rapidly rotating the same in a plane extending transversely of the frame structure and for moving the same along its axis of rotation while it is rotating, a link twisting and distributing means mounted on said frame structure between said casing advancing and constricting means and said tubular container for imparting a twist between each link and the next succeeding link and for depositing the links in a coil in said container, said twisting and distributing means comprising a rapidly rotating throat ring and a hollow distributing tube secured thereto, said throat ring being mounted on said frame structure for rotation about an axis substantially coinciding with the axis of rotation of said tubular container and said distributing tube extending therefrom at an angle relative to said axis, relatively movable means mounted within the passageway in said twisting and distributing means which is formed by said throat ring and distributing tube and means for operating said movable means to frictionally grip the links as they enter the same and to advance the links at a uniform speed through the same and into said tubular container.

3. In a sausage linking machine characterized by a supporting frame structure with means on said frame structure for advancing a filled sausage casing and for constricting the casing at intervals to divide the casing into individual links, and with an open ended hollow cylindrical container rotatably mounted on said frame structure adjacent to an aligned with said casing advancing and constricting means for receiving the connected links therein, which cylindrical container has means connected thereto for rotating the same about its axis and at a relatively high rate of speed, a device located on said frame structure between said casing advancing and constricting means and said cylindrical container for imparting a twist between each link and the next succeeding link and for thereafter depositing the links in said cylindrical container, said device comprising a ring forming a throat member mounted for rotation about an axis concentric with the axis of rotation of the cylindrical container, a bent tubular section connected to said ring and forming a passageway extending forwardly and then radially of the axis of rotation of said ring, a pair of spaced rollers mounted in said passageway adjacent said ring, and drive means connected to said rollers and said ring and operative upon rotation of said ring to rotate said rollers in the same direction to grip the successive links and advance said links between the same.

4. In a sausage linking machine characterized by a casing advancing and dividing means, and an open ended link accumulating cylinder rotatably mounted relative to the discharge end of the casing advancing and dividing means to receive the twisted links therefrom through the open end thereof, a twisting and distributing head positioned between the casing advancing and dividing means and the rotating cylinder, said head including a housing having a throat forming opening therein which is aligned with the casing advancing and dividing means and the axis of rotation of the cylinder, a throat ring rotatably mounted in the opening and having a tube-like extension projecting in a forward and lateral direction therefrom forming a passageway for guiding the links into the accumulating cylinder, transversely extending shafts in said passageway adjacent said throat ring, a pair of friction rollers mounted on said shafts, and drive means connected to said shafts for rotating said rollers in a direction to frictionally grip the links and advance them through said passageway.

5. In a sausage linking machine characterized by a casing advancing and dividing means, and an open ended link accumulating cylinder rotatably mounted relative to the discharge end of the casing advancing and dividing means to receive the twisted links therefrom through the open end thereof, a twisting and distributing head positioned between the casing advancing and dividing means and the rotating cylinder, said head comprising a housing having a throat forming opening therein which is aligned with the advancing and dividing means and the axis of rotation of the cylinder, a throat forming member rotatably mounted in the opening and having a tube-like extension projecting in a forward and lateral direction therefrom forming a passageway for guiding the links into the accumulating cylinder, a pair of spaced friction members rotatably mounted in said passageway adjacent said throat ring, and drive means connected with said friction member for rotating the latter in a direction to frictionally grip the links between the same and advance them through said passageway.

6. In a sausage linking machine having a supporting frame structure with means on said frame structure for advancing a filled sausage casing and for constricting the casing at intervals to divide the same into individual links, and an open ended tube-like container rotatably mounted on said frame structure adjacent to and in axial alignment with said casing advancing and constricting means for receiving the connected links therein, said tubular container having means connected thereto for rotating the same about its axis at a relatively high rate of speed, a device located on said frame structure between said casing constricting means and said tubular container for imparting a twist between each link and the next succeeding link and for thereafter depositing the links in said tubular container, said twist imparting device comprising a rotatably mounted throat forming member, an angular tube connected to said ring and forming therewith an angular passageway extending axially and then radially of the axis of rotation of said throat member, a pair of rollers mounted in spaced relation in said passageway in advance of said throat member, and driving gears actuated by rotation of said throat member and connected to said rollers to rotate the same in a direction to advance the successive links gripped therebetween.

7. In a sausage linking machine having a supporting frame structure with means on said frame structure for advancing a filled sausage casing and for constricting the casing at intervals to divide the casing into individual link forming sections, and an open ended tube-like container mounted on said frame structure adjacent to and aligned with said casing advancing and constricting means for receiving the connected links therein, said tube-like container having means connected thereto for rotating the same about its axis at a relatively high rate of speed, a device located on said frame structure between said casing constricting means and said tube-like container for imparting a twist between each link and the next succeeding link and for thereafter depositing the links in said tube-like container, said twist imparting device comprising a housing having an aperture therein, a ring forming a throat member mounted in said aperture, a bent tubular section connected to said ring and forming a passageway extending forwardly and then radially of the axis of rotation of said ring, a pair of spaced shafts adjacent said throat forming ring, a pair of rollers mounted on said shafts and extending into said passageway, pinion gears on said shafts, a ring gear fixed around the aperture in said housing and drive means connecting said pinion gears and said ring gear to rotate said rollers in the same direction to advance the successive links as the latter pass between the same.

8. In a sausage linking machine having a supporting frame structure with means on said frame structure for advancing a filled sausage casing and for constricting the casing at intervals to divide the casing into individual links, and an open ended hollow cylindrical container rotatably mounted on said frame structure adjacent to and aligned with said casing advancing and constricting means for receiving the connected links therein, said cylindrical container having means connected thereto for rotating the same about its axis at a relatively high rate of speed, a device located on said frame structure between said casing advancing and constricting means and said cylindrical container for imparting a twist between each link and the next succeeding link and for thereafter depositing the links in said cylindrical container, said device comprising a housing having a passageway therein, a ring forming a throat member rotatably mounted in said passageway, a bent tubular section connected to said ring and forming a forwardly and radially extending passageway, a beveled ring gear mounted in said housing around said passageway, a pair of axially aligned shafts mounted on said throat forming ring member, bevel gears on said shafts engaging said beveled ring gear, a pinion on each of said aligned shafts, a pair of spaced parallel shafts in said passageway adjacent said ring member, a pair of rollers on said parallel shafts, and a drive gear on each of said parallel shafts engaging a pinion on one of said aligned shafts whereby to rotate said rollers in the same direction when said throat forming ring member is rotated and to advance the successive links gripped between the rollers.

9. In a sausage linking machine having a supporting frame structure with means on said frame structure for advancing a filled sausage casing and for constricting the casing at intervals to divide the casing into individual links, an open ended hollow cylindrical container rotatably mounted on said frame structure adjacent to and axially aligned with said casing advancing and constricting means for receiving the connected links therein, said cylindrical container having means connected thereto for rotating the same about its axis at a relatively high rate of speed and for slowly advancing the same in a direction along its axis, a device located on said frame structure between said casing advancing and constricting means and said cylindrical container for imparting a twist between each link and the next succeeding link and for thereafter depositing the links in said cylindrical container, said device comprising a housing having an aperture aligned with said casing advancing and constricting means, a ring forming a throat member rotatably mounted in said aperture, a bent tubular section connected to said throat ring and forming a passageway extending forwardly and then radially of the axis of rotation of said throat ring, a pair of spaced shafts adjacent said ring, a pair of friction rollers mounted on said spaced shafts and extending into said passageway, a ring gear fixed in said housing concentric with said throat ring, a pair of axially aligned shafts journalled in said throat ring, bevel gears connecting said aligned shafts in driving relation with said ring gear, and interconnected pinions on said roller shafts and said aligned shafts which are operative upon rotation of said throat ring to rotate said rollers in the same direction and advance the successive links gripped between the same.

10. In a sausage linking machine having a supporting frame structure with means on said frame structure for advancing a filled sausage casing of predetermined length and for constricting the casing at intervals to divide the casing into individual links, and having an open ended hollow cylindrical container rotatably mounted on said frame structure adjacent to and aligned with said casing advancing and constricting means for receiving the connected links therein, which cylindrical container has means connected thereto for rotating the same about its axis at a relatively high rate of speed, a device located on said frame structure between said casing advancing and constricting means and said cylindrical container for imparting a twist between each link and the next succeeding link and for thereafter depositing the links in said cylindrical container, said device comprising a rotatably mounted ring member forming a throat and having a passageway extending forwardly and then radially of the axis of rotation of said ring member, friction members movably mounted in said passageway adjacent said throat, and means connected to said friction members and actuated upon rotation of said ring member to operate said friction members to grip the successive links and advance the same through said passageway.

References Cited in the file of this patent
UNITED STATES PATENTS
2,697,850     Cross _____ Dec. 28, 1954